(12) United States Patent
Lorenz

(10) Patent No.: US 6,585,073 B2
(45) Date of Patent: Jul. 1, 2003

(54) DEVICE FOR STEERING A MOTOR VEHICLE

(75) Inventor: Christian Lorenz, Leidersbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/862,866

(22) Filed: May 22, 2001

(65) Prior Publication Data

US 2002/0000341 A1 Jan. 3, 2002

(30) Foreign Application Priority Data

May 22, 2000 (DE) .......................................... 200 09 211

(51) Int. Cl.⁷ .............................................. B62D 1/12
(52) U.S. Cl. .................. 180/332; 180/402; 180/332; 180/333; 180/335; 74/471 XY; 280/778; 297/216.1; 297/217.1
(58) Field of Search ................................. 180/271, 402, 180/78, 326, 332–336, 315; 74/493, 471 XY; 297/216.1, 183.9, 217.1, 463.1; 701/49; 280/775, 778, 777

(56) References Cited

U.S. PATENT DOCUMENTS

| | | | | |
|---|---|---|---|---|
| 4,140,200 A | * | 2/1979 | Tucek | 180/332 |
| 4,478,308 A | * | 10/1984 | Klaassen | 180/326 |
| 4,702,520 A | * | 10/1987 | Whisler et al. | 180/333 |
| 4,968,058 A | * | 11/1990 | Jones | 280/777 |
| 5,295,712 A | * | 3/1994 | Omura | 280/731 |
| 5,486,019 A | * | 1/1996 | Chevroulet et al. | 180/271 |
| 5,845,735 A | * | 12/1998 | Muller et al. | 180/322 |
| 5,938,282 A | * | 8/1999 | Epple | 180/315 |
| 6,039,142 A | * | 3/2000 | Eckstein et al. | 180/333 |
| 6,065,560 A | * | 5/2000 | Palmeri et al. | 180/326 |
| 6,078,854 A | * | 6/2000 | Breed et al. | 180/273 |
| 6,202,501 B1 | * | 3/2001 | Ikari | 74/496 |

FOREIGN PATENT DOCUMENTS

| | | |
|---|---|---|
| DE | 19639849 | 10/1997 |
| DE | 19917879 | 11/1999 |
| JP | 09002287 | 1/1997 |
| JP | 2000-66753 A | * 3/2000 |

* cited by examiner

Primary Examiner—Paul N. Dickson
Assistant Examiner—Ruth Ilan
(74) Attorney, Agent, or Firm—Tarolli, Sundheim, Covell & Tummino, L.L.P.

(57) ABSTRACT

The invention relates to a device for steering a motor vehicle, the device comprising at least one steering means to be actuated by a driver, the means being coupled electrically with at least one steerable wheel of the motor vehicle. The device further comprises a seat for the driver, the seat including a seat part which forms a seat area, and a backrest part. The steering means are coupled with the seat part and are longitudinally displaceable together with it.

9 Claims, 1 Drawing Sheet

DEVICE FOR STEERING A MOTOR VEHICLE

TECHNICAL FIELD

The invention relates to a device for steering a motor vehicle.

BACKGROUND OF THE INVENTION

So-called steering-by-wire systems provide an electrical coupling of the steering means with drive motors, which provide the wheel deflection of the vehicle. Examples of such embodiments are to be found in DE 196 25 496 C2 and DE 196 25 498 C1.

BRIEF SUMMARY OF THE INVENTION

The invention provides a device for steering a motor vehicle which can be adjusted quickly and simply for various vehicle occupants in order to adapt it to other ergonomic requirements. This is achieved in a device which comprises at least one steering means to be actuated by a driver, the means being coupled electrically with at least one steerable wheel of the motor vehicle. The device further comprises a seat for the driver, the seat including a seat part which forms a seat area, and a backrest part. The steering means are coupled with the seat part and are longitudinally displaceable together with it. In the device proposed, the seat as well as the steering means can be adapted quickly to other occupants or, in a 2- or 3-door vehicle, can be pushed quickly forward for the rear passengers to climb in more simply, because on displacement of the seat the steering means remains unaltered in relation to the seat part.

Furthermore, a development of the invention also permits an additional relative displacement of the steering means to the seat part, in order to optimize the distance of backrest part to steering means; this relative displacement is independent of the displacement in driving operation, which is necessary to steer the vehicle.

According to a preferred embodiment, two steering means are provided, which project to the left and right of the driver, i.e. more precisely upwards from the seat area to be occupied by the driver, and are coupled with the seat part. Furthermore, however, one steering means can also be provided which is arranged centrally on the vehicle seat and extends upwards between the driver's legs.

The two steering means are coupled with each other such that a one-handed steering of the vehicle is possible. This coupling can be constructed so as to be mechanical, hydraulic, pneumatic and/or electric.

Independently of the steering movement, according to the preferred embodiment an additional adjustment of the basic position of the steering means is possible. The additional adjustment in longitudinal direction relative to the seat part has already been mentioned; in addition, an optional displacement of the steering means can be provided horizontally and/or vertically as well as transversely to the longitudinal direction. Thereby, for example, the climbing in and out of the driver is to be facilitated, because the steering means projecting upwards to the side of his pelvic area possibly considerably impedes his climbing in and out. Furthermore, a lowering of the steering means also permits a quicker climbing out of the driver or rescuing of the driver after an accident.

The steering means, which in driving operation preferably projects to over the seat area, is preferably able to be lowered vertically manually or by motor power at least to close to the seat area, preferably to below the seat area. For this, a steering means adjustment by motor power, coupled with a control arrangement, can be provided, electronic driver profiles with their steering means positions being stored in the control arrangement.

According to a development, the drive for lowering the steering means can be actuated in an accident, i.e. the steering means is moved downwards by motor power, so as not to present any further obstacle on leaving the vehicle.

For this purpose, the device can be coupled with an airbag module such that on release of the airbag module the steering means is displaced downwards.

To simplify the entry into the vehicle, the drive for vertical adjustment of the steering means can be coupled with the actuation of the driver's door and/or can depend on the operating state of the vehicle. This means that when the driver opens the door, the steering means is automatically moved downwards; when he closes the driver's door, the steering means is raised. In addition, it is also possible, for example on actuating the ignition or insertion of the ignition key or a substitute means for the ignition key (e.g. chip card), to actuate the drive for the vertical adjustment of the steering means.

In the seat part preferably a recess is provided for the steering means to pass through.

An arm rest which is connected with the driver's seat serves for a better lateral hold of the driver and permits a less tiring posture whilst steering.

The steering means preferably also has acceleration- or deceleration means or serves as such, so that the pedals can also at least partially be eliminated.

Furthermore, according to the preferred embodiment provision is also made that the seat is constructed such that it is able to be used equally for right- and left-hand drive vehicles, whereby only a different cable line guide to the driver's seat is necessary and otherwise no different parts or constructions are necessary for the entire steering means line in right- and left-hand drive vehicles.

DETAILED DESCRIPTION OF THE PREFERRED EMBODIMENT

Figure 1:
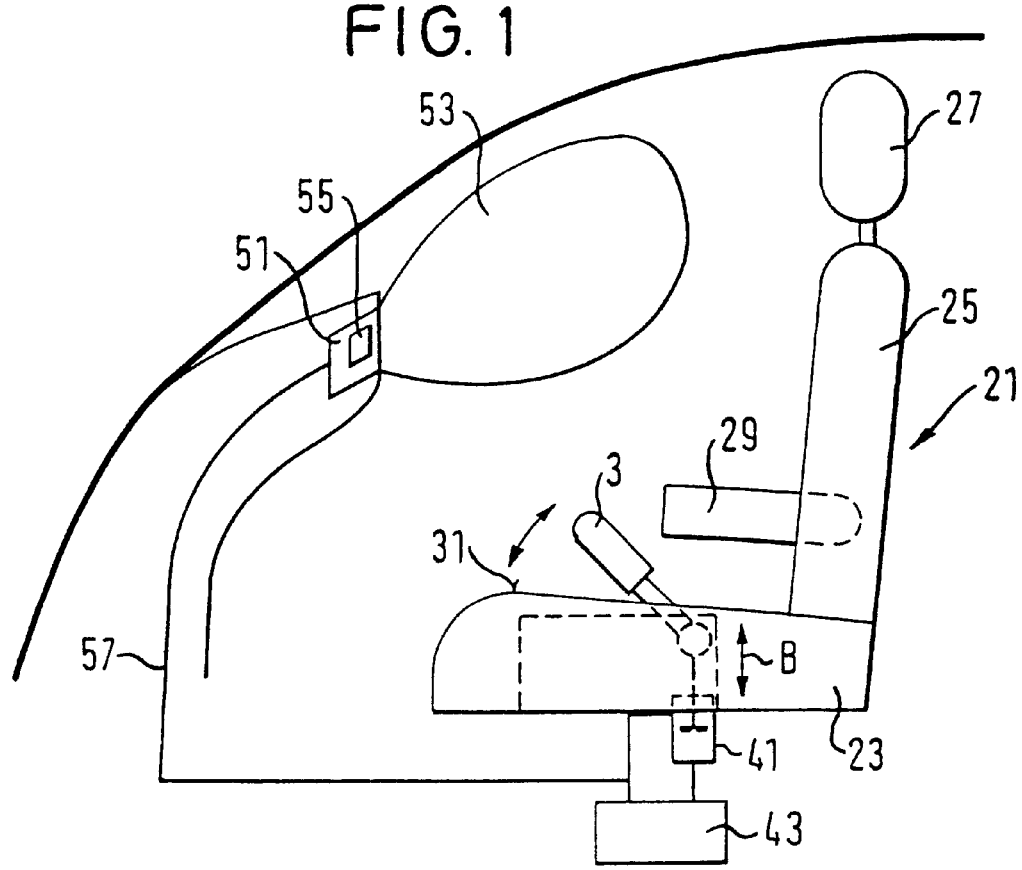
FIG. 1 shows a side view of the device according to the invention.
Figure 2:
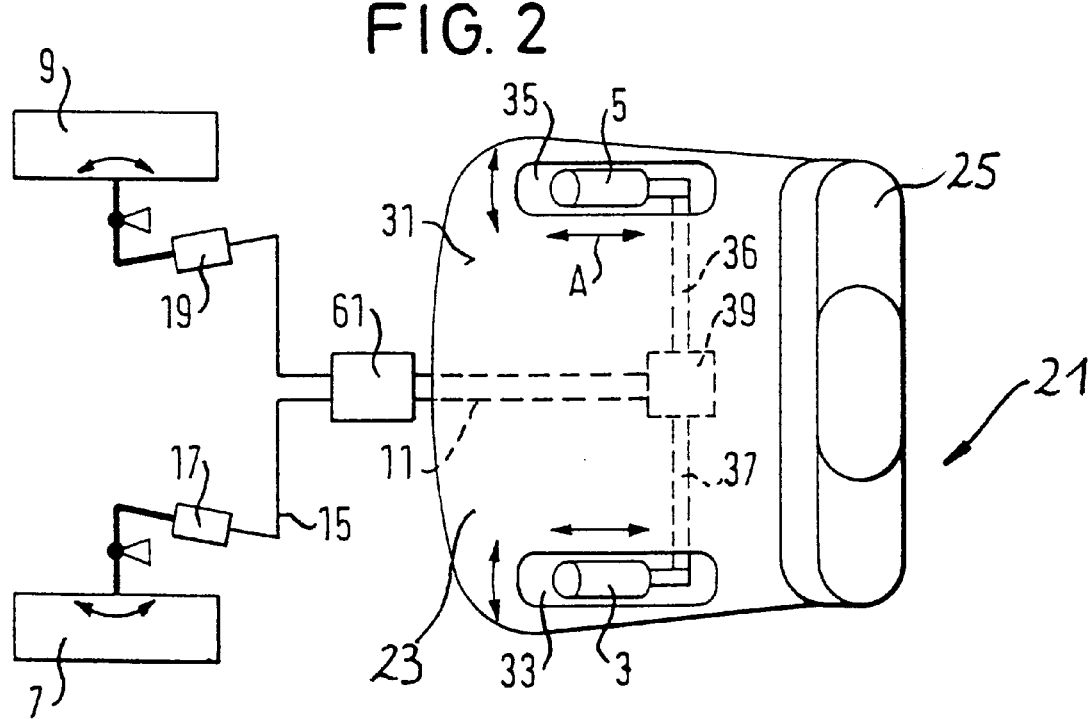
FIG. 2 shows a top view onto the device according to FIG. 1.

In FIG. 1 a device is shown for steering a motor vehicle, which manages without a mechanical coupling of the steering means, in the present case two joystick-like levers 3, 5 with steerable wheels 7, 9 of the vehicle. The steering means, the position of which is proportional to an electrical signal, are in fact coupled via electrical connecting lines 11, 15 with drives 17, 19 for deflecting the wheels 7, 9. This system is also named "steering-by-wire". The device comprises a driver's seat 21, which has a seat part 23 and a pivoting backrest part 25 arranged thereon, and also a head support 27. Arm rests 29 can also be provided on the backrest part 25, which make possible a more relaxed driving and more relaxed steering. To the left and right of the driver, more precisely to the left and right of the seat area 31 to be occupied by him, the seat part 23 has in each case an elongated opening 33, 35, through which a steering means 3, 5 extends. The steering means 3, 5 are coupled with the seat part 23, so that with longitudinal displacement of the seat to adapt to the size of the driver or to make possible entry to the rear in a two- or three-door vehicle, the steering means 3, 5 are also displaced.

The steering means 3, 5 are coupled with each other mechanically by means of the swivel axes 36, 37 and an intercalated gear 39 such that a one-handed steering of the vehicle is possible.

For optimum adaptation of the position of the steering means 3, 5 to the stature of the driver, the steering means 3, 5 are jointly also longitudinally displaceable relative to the seat part 23 in the direction of arrow A, and namely independently of the steering movement. Furthermore, the steering means 3, 5 are also displaceable vertically by means of a drive 41 for lowering the steering means 3, 5. The drive 41 is actuated by means of a control arrangement 43 in which various driver's profiles are stored, i.e. their setting of seat part 23, backrest part 25 and steering means 3, 5 (the latter in the basic position). Furthermore, the drive 41 is also coupled with an airbag module 51. The airbag module 51 comprises a gas bag 53 and a gas generator 55. With actuation of the gas generator 55, it is assumed that an accident is imminent and a steering maneuver has no further effect on the vehicle, so that for example the drive 41 is actuated electrically or by means of a gas line 57, which leads to the two steering means 3, 5 being displaced downwards, as symbolized by the arrow B. In the downwardly displaced position, the steering means 3, 5 lie completely beneath the seat area, in order to make possible an easier climbing in or out of the driver.

The vehicle seat together with the steering means 3, 5 is constructed such that it is able to be used equally for right- and left-hand drive vehicles.

The illustrated device functions as follows: When the driver opens the vehicle, each steering means 3, 5 is lowered by the drive 41 into the seat part 23 or remains lowered therein. To facilitate entry, the vehicle seat is automatically moved fully to the rear. After the driver has sat down, he inserts the ignition key into the ignition lock or inserts a corresponding chip card into a corresponding slit, whereupon the control arrangement 43 can verify his identity. The driver's seat 21 together with the steering means 3, 5 is brought in longitudinal direction into the optimum sitting position previously determined and stored by the driver, an adjustment of the seat rest 25 also being able to take place. In addition, the drive 41 is actuated and the steering means 3, 5 travel upwards, in order to project with respect to the seat area 31, as shown.

By moving the steering means 3,5 forward and to the rear and in the opposite direction and also possibly laterally, the vehicle can be steered, because the setting of the steering means 3,5 is constantly polled by means of sensors (not shown), and the corresponding pulses are sent to a central control unit 61. The control unit 61 processes the signals and controls the drives 17, 19 accordingly, in order to achieve the desired wheel deflection. Not only the desired wheel deflection but possibly also an acceleration or deceleration of the vehicle can be controlled by means of the setting of the steering means 3, 5.

In the case of an accident, not only is the gas bag 53 unfolded, but also the two steering means 3, 5, as already explained, are moved downwards.

What is claimed is:

1. A device for steering a motor vehicle, said device comprising:

a seat for a driver of the motor vehicle, said seat including a seat part on which the driver of the motor vehicle sits and a backrest part against which the driver of the motor vehicle leans; and a means for steering the motor vehicle, said steering means being actuatable by the driver, said steering means being electrically coupled to a steerable wheel of the motor vehicle for steering the motor vehicle, said steering means being mechanically coupled with said seat part such that said steering means is longitudinally displaceable together with said seat part when said seat part is displaced longitudinally relative to the motor vehicle for facilitating passenger access to the motor vehicle, said seat part having at least one elongated opening, said steering means extending through said elongated opening.

2. The device as set forth in claim 1, wherein said steering means comprises two joysticks each projecting upward from said seat part, one to the left of the driver and one to the right of the driver.

3. The device as set forth in claim 2, wherein said two joysticks are coupled with each other such that one-handed steering of the motor vehicle is possible.

4. The device as set forth in claim 1, wherein said steering means projects upward while in a driving position, said steering means being lowered by motor power adjacent said seat part in a non-driving position.

5. The device as set forth in claim 1 further including a motor drive for lowering said steering means upon the occurrence of a collision situation.

6. The device as set forth in claim 1, wherein said device is coupled with an airbag module such that said steering means is displaced downward when said air bag module is actuated.

7. The device as set forth in claim 1 further including at least one armrest extending from said backrest part, the position of said armrest having no effect on the operation of said steering means.

8. The device as set forth in claim 1, wherein said steering means controls acceleration and deceleration of the motor vehicle.

9. The device according to claim 1, wherein said device may be used for right-hand drivers and left-hand drivers.

* * * * *